(12) United States Patent
Ying et al.

(10) Patent No.: US 7,787,034 B2
(45) Date of Patent: Aug. 31, 2010

(54) IDENTIFICATION OF INTEGRATED CIRCUITS USING PIXEL OR MEMORY CELL CHARACTERISTICS

(75) Inventors: Bond Yu-Pong Ying, Corvalis, OR (US); Richard Wesley Garvin, Corvallis, OR (US); Yan Ping Lim, Albany, OR (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1133 days.

(21) Appl. No.: 11/412,433

(22) Filed: Apr. 27, 2006

(65) Prior Publication Data

US 2007/0262980 A1 Nov. 15, 2007

(51) Int. Cl.
*H04N 9/64* (2006.01)
(52) U.S. Cl. ............... 348/247; 348/222.1; 348/231.3; 348/294
(58) Field of Classification Search .......... 348/243–250
See application file for complete search history.

(56) References Cited

U.S. PATENT DOCUMENTS

| | | | |
|---|---|---|---|
| 5,051,895 A | 9/1991 | Rogers | |
| 5,079,725 A | 1/1992 | Geer et al. | |
| 5,301,143 A | 4/1994 | Ohri et al. | |
| 5,350,715 A | 9/1994 | Lee | |
| 5,553,022 A | 9/1996 | Weng et al. | |
| 5,553,766 A | 9/1996 | Jackson et al. | |
| 5,641,915 A | 6/1997 | Boucher et al. | |
| 5,742,526 A | 4/1998 | Voshell et al. | |
| 5,818,738 A | 10/1998 | Effing et al. | |
| 5,895,962 A | 4/1999 | Zheng et al. | |
| 6,147,316 A | 11/2000 | Beffa | |
| 6,161,213 A | 12/2000 | Lofstrom | |
| 6,190,972 B1 | 2/2001 | Zheng et al. | |
| 6,365,421 B2 | 4/2002 | Debenham et al. | |
| 6,601,008 B1 | 7/2003 | Madge | |
| 6,710,284 B1 | 3/2004 | Farnworth et al. | |
| 6,812,477 B2 | 11/2004 | Matsunami | |
| 6,813,058 B1 | 11/2004 | Sandstrom | |
| 6,830,941 B1 | 12/2004 | Lee et al. | |
| 6,889,305 B2 | 5/2005 | Andelmann | |
| 6,941,536 B2 | 9/2005 | Muranaka | |
| 6,944,567 B2 | 9/2005 | Beffa | |

(Continued)

OTHER PUBLICATIONS

"Empirical dark current modeling for complementary metal oxide semiconductor active pixel sensors" by Shcherback et al. in Opt. Eng. 41(6) 1216-1219, Jun. 2002.

"Photoresponse Analysis and Pixel Shape Optimization for CMOS Active Pixel Sensors" by Shcherback et al. in IEEE Transaction on Electron Devices, vol. 50, No. 11, Jan. 2003.

"Dark Current Reduction Techniques for Wide Dynamic Range Logarithmic CMOS Pixels" by Choubey et al., accepted to the 30th International Congress of Imaging Science, pp. 1-5, May 2006.

*Primary Examiner*—Gevell Selby (57) ABSTRACT

Disclosed are various embodiments of methods and corresponding devices for effecting such methods that permit integrated circuits, sensors, chips or dies to be identified. Imperfections or irregularities in pixels or memory cells are used to generate identification codes for integrated circuits, sensors, chips or dies. Addresses or data locations of selected defective pixels or memory cells may be used to generate such identification codes.

32 Claims, 6 Drawing Sheets

U.S. PATENT DOCUMENTS

| | | |
|---|---|---|
| 6,960,753 B2 | 11/2005 | Cheung |
| 6,990,387 B1 | 1/2006 | Freij et al. |
| 6,996,484 B2 | 2/2006 | Reitter |
| 7,015,795 B2 | 3/2006 | Doudoumopolous |
| 7,017,043 B1 | 3/2006 | Potkonjak |
| 7,271,833 B2 * | 9/2007 | Kubota et al. ............... 348/245 |
| 7,291,507 B2 * | 11/2007 | Bidermann et al. ........... 257/48 |
| 7,368,697 B2 * | 5/2008 | Moody et al. ............ 250/208.1 |
| 2002/0168815 A1 * | 11/2002 | Hartmann ................... 438/201 |
| 2003/0223004 A1 * | 12/2003 | Kubota et al. ............... 348/294 |

* cited by examiner

IDENTIFICATION OF INTEGRATED CIRCUITS USING PIXEL OR MEMORY CELL CHARACTERISTICS

FIELD OF THE INVENTION

The present invention relates to the field of identifying semiconductor sensors, integrated circuits, dies and chips.

BACKGROUND

Semiconductor dies often need to be identified for a variety of reasons, including, but not limited to, tracking dies during manufacturing, tracking die inventories, determining the date upon which a particular die or group of dies was manufactured, determining the particular manufacturing batch corresponding to a particular die, and so on. Identification information ideally permits a particular semiconductor die, either during or after manufacturing, to be identified with 100% confidence. Once a particular die has been identified, other information pertaining to the die may be retrieved or used, such as the die's date of manufacture, manufacturing batch information associated with the die, the date the die was shipped from the foundry, royalty information associated with the die, and other information.

Most current semiconductor die identification methods use non-volatile storage elements, such as RFID tags, fuses or non-volatile memories to store die identification information or tags. These methods generally require that additional circuitry for storing such information be incorporated into the die. They also generally involve extra tasks such as programming non-volatile elements. As a result, prior art die identification methods can involve considerable costs due to the need to provide extra circuitry and extra test and programming time.

One example of a prior art method of identifying semiconductor dies is provided by SiidTech Inc. of Hilsboro, Oreg., who employ "silicon fingerprinting technology" to trace semiconductor dies, and incorporate such technology into RFID circuits, smart cards and badges and hardware keys. Still other applications include tagging, authentication and intellectual property tagging.

Various patents containing subject matter relating directly or indirectly to the field of the present invention include, but are not limited to, the following:

U.S. Pat. No. 6,161,213 for System for providing an integrated circuit with a unique identification to Lofstrom.

U.S. Pat. No. 5,051,895 for Apparatus and method for tracking and identifying printed circuit assemblies to Rogers.

U.S. Pat. No. 5,079,725 for Chip identification method for use with scan design systems and scan testing techniques to Geer at al.

U.S. Pat. No. 5,301,143 for Method for identifying a semiconductor die using an IC with programmable links to Ohri et al.

U.S. Pat. No. 5,350,715 for Chip identification scheme to Lee.

U.S. Pat. No. 5,553,022 for Integrated circuit identification apparatus and method to Weng et al.

U.S. Pat. No. 5,642,307 for Die identifier and die identification method to Jernigan.

U.S. Pat. No. 5,742,526 for Apparatus and method for identifying an integrated device to Voshell et al.

U.S. Pat. No. 5,818,738 for Method for testing the authenticity of a data carrier having an integrated circuit to Effing et al.

U.S. Pat. No. 5,895,962 for Structure and a method for storing information in a semiconductor device to Zheng et al.

U.S. Pat. No. 6,147,316 for Method for sorting integrated circuit devices to Beffa.

U.S. Pat. No. 6,190,972 for Method for storing information in a semiconductor device to Zheng et al.

U.S. Pat. No. 6,365,421 for Method and apparatus for storage of test results within an integrated circuit to Debenham et al.

U.S. Pat. No. 6,601,008 for Parametric device signature to Madge.

U.S. Pat. No. 6,710,284 for Laser marking techniques for bare semiconductor die to Farnworth et al.

U.S. Pat. No. 6,812,477 for Integrated circuit identification to Matsunami.

U.S. Pat. No. 6,813,058 for Method and apparatus for personalization of semiconductor to Sandstrom.

U.S. Pat. No. 6,830,941 for Method and apparatus for identifying individual die during failure analysis to Lee at al.

U.S. Pat. No. 6,889,305 for Device identification using a memory profile to Andelmann.

U.S. Pat. No. 6,941,536 for Method for identifying semiconductor integrated circuit device, method for manufacturing semiconductor integrated circuit device, semiconductor integrated circuit device and semiconductor chip to Muranaka.

U.S. Pat. No. 6,960,753 for Photosensor arrays with encoded permanent information to Cheung.

U.S. Pat. No. 6,990,387 for Test system for identification and sorting of integrated circuit devices to Freij et al.

U.S. Pat. No. 6,944,567 for Method in an integrated circuit (IC) manufacturing process for identifying and redirecting ICs mis-processed during their manufacture to Beffa.

U.S. Pat. No. 6,996,484 for Sequential unique marking to Raitter.

U.S. Pat. No. 7,015,795 for Self-identifying integrated circuits and method for fabrication thereof to Doudoumopolous.

U.S. Pat. No. 7,017,043 for Methods and systems for the identification of circuits and circuit designs to Potkonjak.

What is needed is a method and device for tracking semiconductor dies during and after manufacturing that is accurate and inexpensive, and that does not require additional circuitry on, or additional programming of, the dies. Upon having read and understood the Summary, Detailed Descriptions and Claims set forth below, those skilled in the art will appreciate that at least some of the devices and methods disclosed in the printed publications listed herein may be modified advantageously in accordance with the teachings of the present invention.

SUMMARY

In a first embodiment of the present invention, there is provided a first method of generating an identification tag corresponding to a selected imaging sensor. The sensor comprises a first array of image pixels and a second array of reference pixels, where the first array is configured to capture images and the second array is configured to permit black or dark level compensation of images captured by the first array. Each reference pixel has a dark current value and an address associated therewith. The first method comprises providing the selected imaging sensor; downloading dark signal values and addresses corresponding thereto from the second array; selecting, from among the dark signal values and addresses corresponding thereto, selected dark signal values and addresses corresponding thereto; and generating, from the selected dark signal data and addresses corresponding thereto, an identification tag corresponding to the selected sensor.

In a second embodiment of the present invention, there is provided a second method of identifying a selected imaging sensor, where the sensor comprises a first array of image pixels and a second array of reference pixels. The first array is configured to capture images and the second array is configured to permit black or dark level compensation of images captured by the first array. Each reference pixel has a dark current value and an address associated therewith. The second method comprises providing the selected imaging sensor; downloading dark signal values and addresses corresponding thereto from the second array; selecting, from among the dark signal values and addresses corresponding thereto, selected dark signal values and addresses corresponding thereto; generating, from the selected dark signal data and addresses corresponding thereto, an identification tag corresponding to the selected sensor, and associating the identification tag with a previously generated identification tag stored in a computer readable medium.

In a third embodiment of the present invention, there is provided a system for generating an identification tag corresponding to a selected integrated circuit, where the integrated circuit comprises a first array of image pixels and a second array of reference pixels. The first array is configured to capture images and the second array is configured to permit black or dark level compensation. Each reference pixel has a dark current value and an address associated therewith. The system comprises means for providing the selected integrated circuit; means for downloading or measuring the dark signal levels and addresses associated therewith; means for selecting, from among the dark signal values and addresses associated therewith, selected dark signal values and the addresses associated therewith; and means for generating, from the selected dark signal values and addresses associated therewith, an identification tag for the selected integrated circuit.

In a fourth embodiment of the present invention, there is provided a third method of generating an identification tag corresponding to a selected integrated circuit, where the integrated circuit comprises a first array of cells or pixels and a second array of cells or pixels. The cells or pixels of the first array are configured to carry out a first function, and the cells or pixels of the second array are configured to carry out a second function different from the first function. Each cell or pixel in the second array has a signal level and address corresponding thereto. The third method comprises: providing the selected integrated circuit; downloading or measuring the signal levels and corresponding addresses from the second array; selecting, from among the signal levels, selected signal levels having predetermined characteristics; and generating, using the addresses corresponding to the selected signal levels, an identification tag for the selected integrated circuit.

In a fifth embodiment of the present invention, there is provided a fourth method of generating an identification tag corresponding to a selected means for imaging, where the imaging means comprises a first array of means for capturing light and a second array of masked means for capturing light. The first array is configured to capture images and the second array is configured to permit black or dark level compensation of images captured by the first array. Each masked means for capturing light has a dark signal value and an address associated therewith. The fourth method comprises: providing the selected imaging means; downloading dark signal values and addresses corresponding thereto from the second array; selecting, from among the dark signal values and addresses corresponding thereto, selected dark signal values and addresses corresponding thereto; and generating, from the selected dark signal data and addresses corresponding thereto, the identification tag.

In a sixth embodiment of the present invention, there is provided a fifth method of generating an identification tag corresponding to a selected integrated circuit (IC), where the IC comprises an array of memory cells, and each memory cell has an address associated therewith. The fifth method comprises: providing the selected IC; determining the addresses of one or more defective memory cells in the selected IC; selecting, from among the addresses data locations corresponding to the defective memory cells, selected defective memory cell addresses; and generating, from the selected defective addresses an identification tag corresponding to the selected IC.

In the foregoing and other embodiments of the present invention, addresses may be provided in a (row, column) or other data location format familiar to those skilled in the semiconductor arts.

In the foregoing and other embodiments of the present invention, methods, and corresponding means of effecting same, may additionally comprise, but are not limited to, one or more of: at least one of storing and saving the downloaded black or dark signal values and addresses corresponding thereto; storing and saving the identification tag in a computer readable medium; combining the initial identification tag with other information to form combined information; determining whether the identification tag has been generated previously; retrieving other information associated with the identification tag; using the identification tag to at least one of track the sensor during manufacturing, track the sensor after manufacturing, track sensor inventory, determine the date upon which the sensor was manufactured or shipped from the foundry, determine the particular manufacturing batch corresponding to the sensor, determine the process, manufacturing or material history corresponding to the sensor, identify manufacturing problems associated with the sensor, identify material problems associated with the sensor, calculate or determine royalties associated with the sensor, determine which patents or licenses correspond to the sensor, determine whether an appropriate license has been taken by the manufacturer of the sensor, determine ownership of the sensor, record or determine the uses or applications of the sensor, improve quality control, sort the sensor, and acquire or use sensor defect or failure data; and associating other information with the identification tag.

In the foregoing and other embodiments of the present invention, identification tags may additionally be employed to at least one of track an IC during manufacturing, track an IC after manufacturing, track sensor inventory, determine the date upon which an IC was manufactured or shipped from the foundry, determine the particular manufacturing batch corresponding an IC, determine the process, manufacturing or material history corresponding to an IC, identify manufacturing problems associated with an IC, identify material problems associated with an IC, calculate or determine royalties associated with an IC, determine which patents or licenses correspond to an IC, determine whether an appropriate license has been taken by the manufacturer of an IC, determine ownership of an IC, record or determine the uses or applications of an IC, improve quality control, sort an IC, and acquire or use IV defect or failure data. "Other information" may be associated with an identification tag and may include one or more of: manufacturing information, date of manufacture, time of manufacture, manufacturing run number, type or model number of selected sensor, manufacturing plant identification, materials or components employed, suppliers of materials or components, shipping date, manufacturing ambient environment data, wafer or wafer batch from which selected sensor was manufactured, customer for which integrated selected sensor was manufactured, information regarding problems or particularities occurring on the date of manufacture or during the manufacturing run, intellectual property royalty, licensing or identification information, trade secret information, copyright information, and intellectual property identification information.

BRIEF DESCRIPTION OF THE DRAWINGS

Numerous aspects of the various embodiments of the present invention will is become apparent from the following specification, drawings and claims in which:

The drawings are not necessarily to scale. Like numbers refer to like parts or steps throughout the drawings.

DETAILED DESCRIPTIONS

Set forth hereinbelow are detailed descriptions of some preferred embodiments of the present invention.

Figure 1:
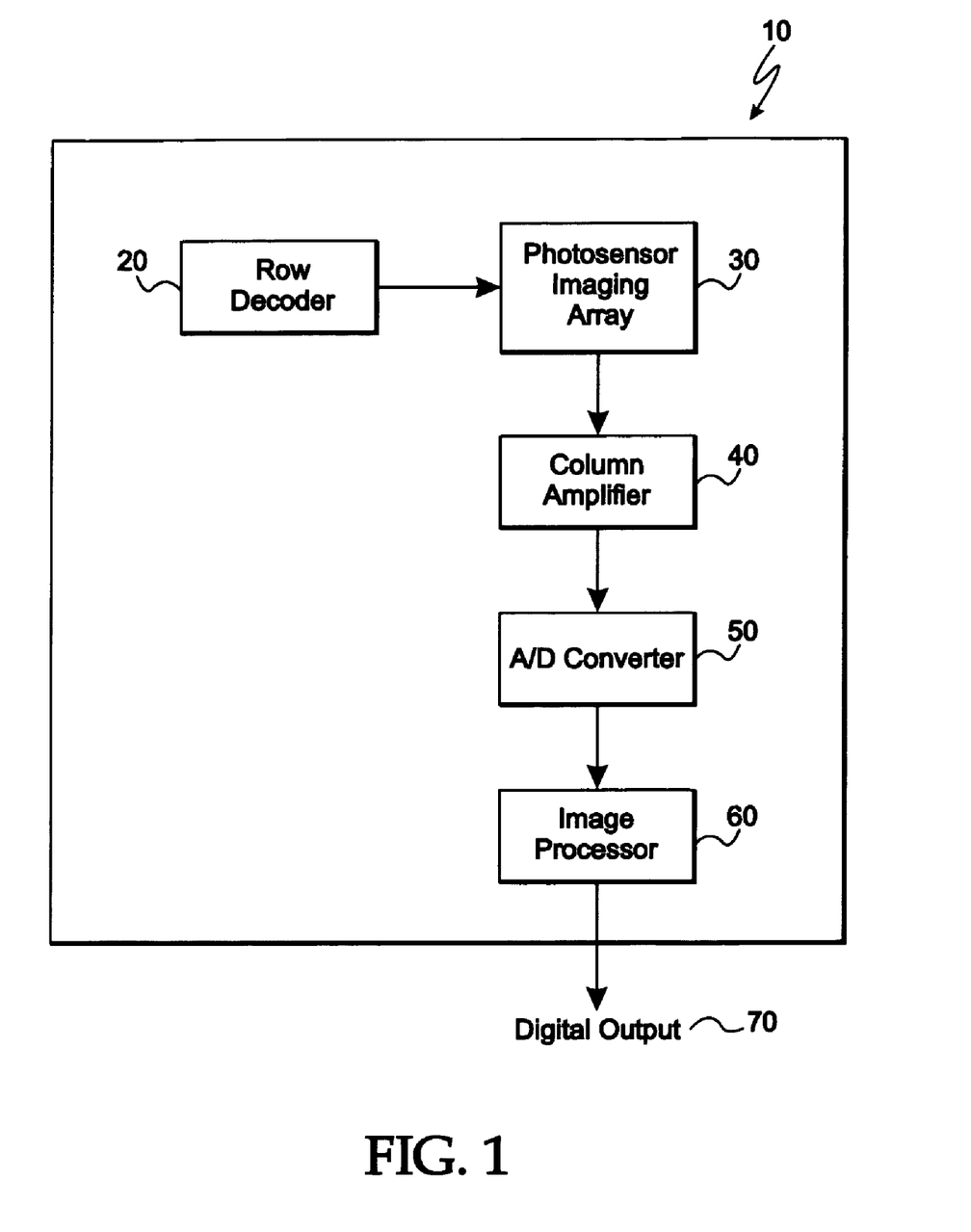
FIG. 1 shows a block diagram of one embodiment of integrated circuit 10 suitable for use in the present invention.

FIG. 1 shows a block diagram of one embodiment of integrated circuit 10 suitable for use in the present invention. In FIG. 1, integrated circuit 10 is a CMOS (complementary metal oxide semiconductor) imaging sensor comprising row decoder 20, photosensor imaging array 30, column amplifier 40, A/D converter 50 and image processor 60. In one embodiment of integrated circuit 10, row decoder 20 is a line address register, and column amplifier 40 comprises column CDS circuits and a horizontal shift register that transfer analog voltages provided by photosensor imaging array 30 to A/D converter 50. As shown in FIG. 1, integrated circuit 10 includes not only photosensor imaging array 30, but further preferably includes a number of processing and control circuits capable of executing or carrying out functions such as timing logic, exposure control, A/D conversion, shutter control, white balance gain adjustment and image processing.

Figure 3:
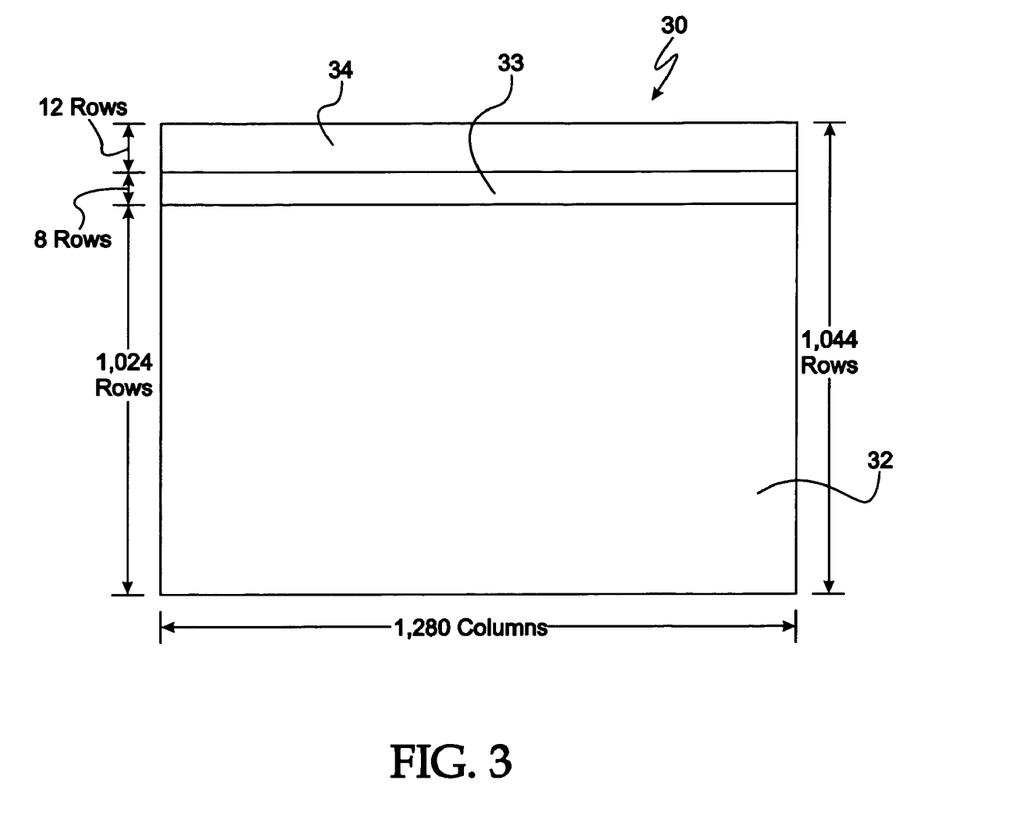
FIG. 3 shows one embodiment of imaging array 32, separation array 33 and identification or reference array 34 suitable for use in the present invention.

Referring now to FIGS. 1 and 3, photosensor imaging array 30 typically comprises active pixel imaging array 32, which is employed to capture digital images, and optically shielded pixel or identification array 34, which in the embodiment of the present invention now being described is employed for black or dark level compensation of images captured by active pixel area 32 (see FIG. 3). Photosensor imaging array preferably comprises photodiode or photogate photosensitive pixel elements, and most preferably comprises active pixel sensors having one or more photodiodes and a readout amplifier incorporated into each pixel, thereby permitting charge accumulated in each photodiode to be converted into an amplified voltage inside each pixel prior to being transferred in sequential rows and columns to A/D converter 50 via column amplifier 40.

For example, photosensors in arrays 33 and 34 may be covered with one or more layers of metal oxide and/or other suitable optically opaque materials that are preferably amenable to semiconductor manufacturing processes. These layers prevent the ingress of light into the individual photosensor wells from which optically shielded array 34 and separation array 33 are composed, thereby theoretically preventing the generation of charge and voltage that would otherwise arise from the presence of light.

In one preferred embodiment of the present invention, active pixel array 32 and identification pixel array 34 are identical with the exception that array 34 has been masked, shielded or covered with metallic or other layers during the sensor die manufacturing process such that external light incident upon sensor 10 cannot reach the reference pixels contained in array 34. This permits identification or optically-shielded array 34 to be used for black or dark level compensation, typically carried out by a black or dark level compensation algorithm or frame rate clamp that subtracts the average signal level of the reference pixels in array 34 from the signal levels measured in active pixel array 32, thereby compensating for temperature and time-dependent dark current noise occurring in the active imaging pixels. Another function of array 34 is to provide the addresses of high dark current pixels so as to permit an identification signature or tag unique or reasonably unique to sensor 10 to be generated, more about which we say below.

As shown in FIG. 3, optically shielded pixel array 34 is preferably separated from active pixel array 32 by separation pixel array 33, which functions to prevent appreciable quantities of light from leaking between active array 32 and optically shielded array 34. Photosensors in separation array 33 are typically optically shielded in the same manner as those in optically shielded array 34.

In active pixel imaging array 32 and identification or optically shielded pixel array 34, in the absence of light ideally no charge is generated by the photodiode or photogate corresponding to each pixel. In practice, however, and even in the complete absence of light, an additional contribution to current flowing through the load transistor of each pixel is present. This additional contribution is known as the dark current and arises primarily from the leakage currents associated with each pixel. Dark current noise can exhibit a significant degree of fluctuation from pixel to pixel, and depends heavily on ambient operating conditions. Dark current noise increases with ambient temperature.

Variations in dark current noise between pixels occur in optically shielded array 34. Such variations are partially random in nature and occur for several reasons, including the presence of minute imperfections in the sensor die, which in turn result from imperfections in manufacturing and materials. Factors that can potentially contribute to dark signal noise variation in second reference pixel array 30 include, but are not limited to, variations in semiconductor crystalline, well, layer and transistor structures, lattice defects, oxide breakdown, MOS channel surface inversion, electromigration, metal corrosion, metal stress-voiding, soft errors due to alpha particles from cosmic and other sources of radiation, and the presence of impurities, particulates, hot electron and high energy carriers, undesired metals and undesired organic chemicals.

Dark current noise can be lowered using various techniques, such as the use of pinned photodiodes in which a shallow p+layer on top of the photodiode fills the interface states by means of holes, preventing them from generating dark current noise. Further information concerning dark current noise may be found in: (1) "Empirical dark current modeling for complementary metal oxide semiconductor active pixel sensors" by Shcherback et al. in Opt. Eng. 41(6) 1216-1219, June 2002; (2) "Photoresponse Analysis and Pixel Shape Optimization for CMOS Active Pixel Sensors" by Shcherback et al. in IEEE Transaction on Electron Devices, Vol. 50, No. 11, January, 2003; and (3) "Dark Current Reduction Techniques for Wide Dynamic Range Logarithmic CMOS Pixels" by Choubey et al., accepted to the 30th International Congress of Imaging Science, pp. 1-5, May 2006.

Owing to technical, cost and manufacturing reasons, it is generally preferred that the photosensors forming the pixels of arrays 32, 33 and 34 be of identical type and construction (e.g., APS photodiodes having the same functional characteristics and construction). Note that photosensor imaging array 30 is formed of rows and columns of photosensors such that each photosensor in array 30 has a unique address (x,y) defined by the particular row and column corresponding thereto.

Referring again to FIG. 1, photosensor imaging array 30 preferably comprises a conventional Bayer or CMY polymeric filter array which covers active pixel array 32, as is well known in the art. In the conventional Bayer filter array two green pixels are provided for each blue pixel and each red pixel. Other types of filter arrays known in the art may also be used, such as a Bayer pattern using subtractive primaries, a red/green/blue plus emerald filter as employed by SONY in the DCS F828 product, a cyan, magenta, yellow and green array used in some video cameras to provide a compromise between maximum light sensitivity and high color quality, or a yellow/cyan/green/unfiltered array such as that employed by HITACHI and JVC in some video cameras.

When an image is acquired (or an "integration period" has been initiated) by sensor 10, in one embodiment of the present invention all the pixels in active array 32 are reset, typically (but not necessarily) one row at a time, by row decoder 20, which preferably comprises on-board timing and control circuitry and line address register functionality. In one embodiment, once the integration or image capture period has ended, the voltage generated in each pixel of arrays 32 and 34 is transferred serially under control of row decoder 20 to column amplifier 40, which typically includes a correlated double sampling (CDS) circuit to correct each pixel for reset and amplifier noise, a horizontal shift register and an amplifier circuit.

Once gain and offset values have been assigned in the amplifier, pixel information is preferably shifted serially to A/D converter 50 where the pixel data are rendered into a linear digital array of binary digits. Image processor 60 receives pixel information from A/D converter 50 and performs image recovery and processing functions thereon. For example, image processor applies a black or dark level compensation algorithm (or "frame rate clamp") to the image pixel data, typically by subtracting the average signal level of the optically shielded pixels, thereby compensating for temperature and time-dependant dark current noise in the imaging pixels.

Other types of image processing may be performed on the image pixel data by image processor 60 or other components of sensor 10, including, but not limited to, anti-aliasing filtering, white balance compensation, smoothing, sharpening, color balance, aperture control, and other signal processing functions. Note that image processing and other functionality may be incorporated into virtually any of blocks 20, 30, 40, 50 and 60 shown in FIG. 1, depending on the specific circuitry and architecture actually employed in sensor 10. (See, for example, the block diagram of one embodiment of sensor 10 shown in FIG. 2, where various types of functionality are incorporated into many different portions of sensor 10.) After the image pixel data have been sufficiently processed they may be sent to a digital signal processor for buffering to an output port (not shown in FIG. 1) and subsequently provided as digital output 70.

Figure 2:
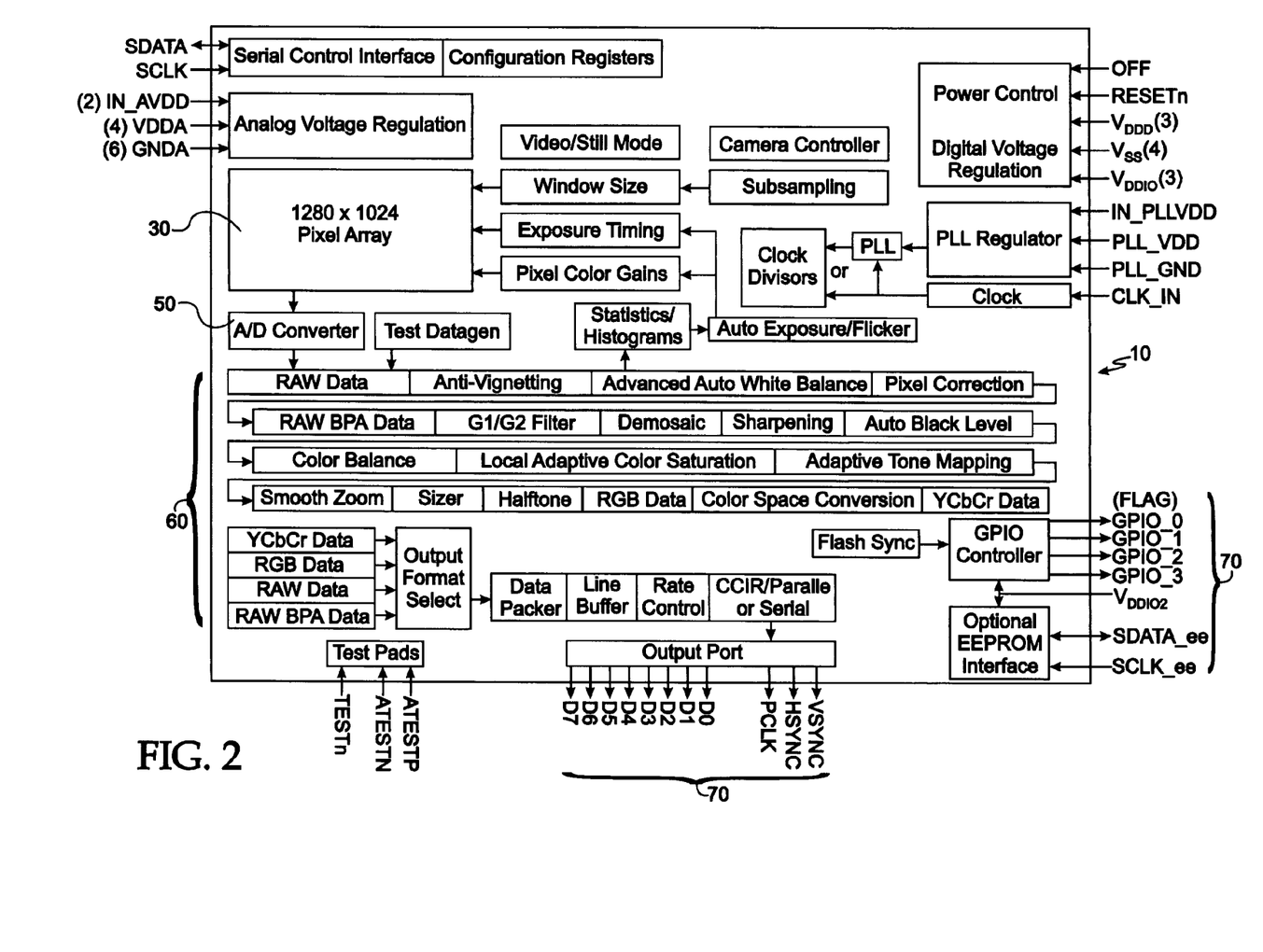
FIG. 2 shows one embodiment of sensor 10 suitable for use in the present invention.

Referring now to FIG. 2, there is shown one example of sensor 10 that may be employed according to one embodiment of the present invention. FIG. 2 shows a block diagram of an AVAGO TECHNOLOGIES ADCC-3000 Landscape 1.3 megapixel ¼" CMOS image sensor 10 with integrated image processor 60. Digital output data 70 are transmitted using a parallel port. Internal FIFO data handling with automatic lowest power management is supported to reduce output clock frequency, host processor bandwidth requirements, power and EMI. Active pixel array 32 comprises 1,280 columns and 1,024 rows of active pixels in a ¼" format. Sensor 10 of FIG. 2 employs 2.8 micron pixel design and is manufactured using a 0.18 micron process. Not shown in FIG. 2 are optically shielded pixel array 34 and separation pixel array 33, both of which are incorporated into photosensor imaging array 30. On-chip A/D converter 50 provides up to 10-bit resolution per pixel. Further details concerning the particular sensor illustrated in FIG. 2 may be found in the AVAGO TECHNOLOGIES data sheet for the ADCC-3000 product, the entirety of which is hereby incorporated by reference herein in its entirety. Another example of a product that may be employed in the present invention is the AVAGO TECHNOLOGIES ADCC-3850 CMOS image sensor, the AVAGO TECHNOLOGIES data sheet for which is also hereby incorporated by reference herein in its entirety.

Figure 4:
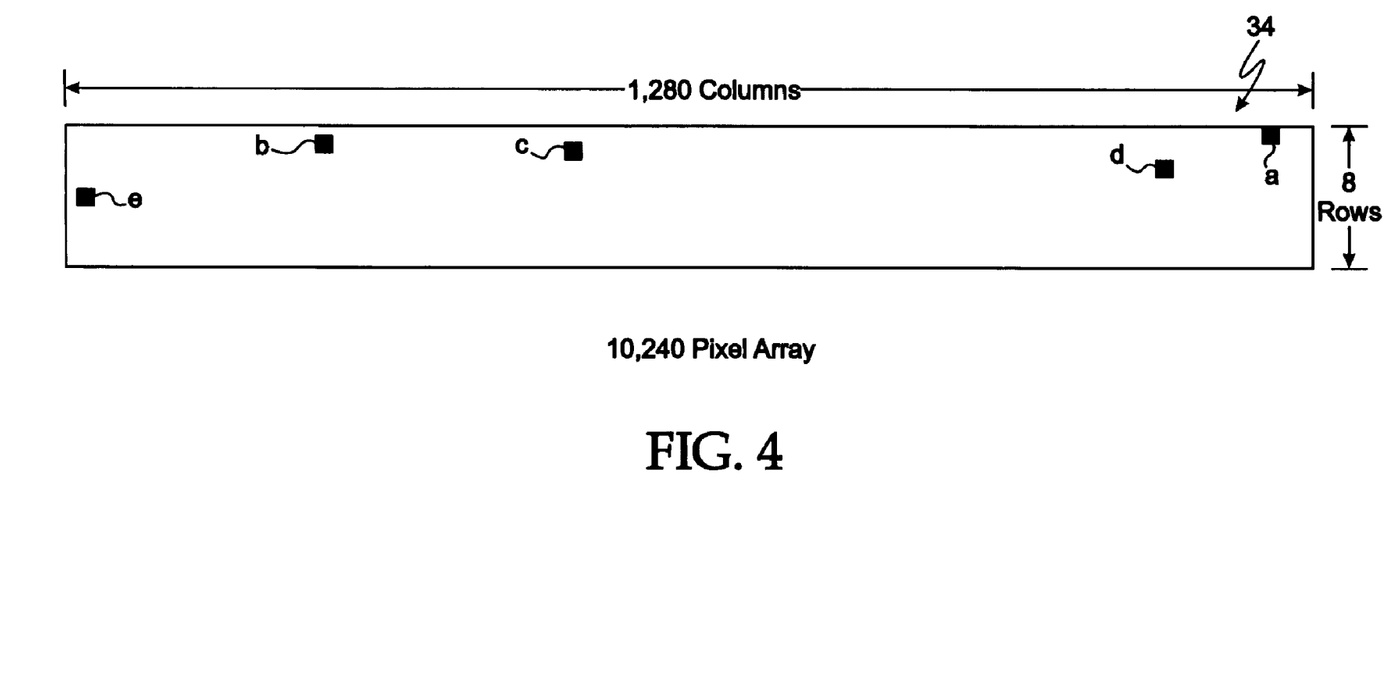
FIG. 4 shows one embodiment of identification or reference array 34 suitable for use in the present invention.

Referring now to FIG. 4, there is shown a schematic representation of one embodiment of optically shielded pixel array 34 comprising an array of 8 rows by 1,280 columns to form a total of 10,240 optically shielded pixels. Note that for illustrative purposes identification or optically shielded array 34 in FIG. 4 is not drawn to scale, and that for purposes of clarity separation array 33 and active pixel array 32 are not shown in FIG. 4. In respect of sensor 10, the vast bulk of the pixels forming array 34 will provide dark signal values at digital output 70 that are less than 1 or 2 on a 10-bit scale. In all cases observed heretofore by the inventors of the present invention, however, a small number of optically shielded pixels in array 34 will provide "bad" or high dark signal values. In the illustrative example provided in FIG. 4, darkened pixels a through e are those pixels having the five highest dark signal values from among all the pixels in array 34.

It has been discovered that the spatial distribution of high dark signal value pixels in array 34 is approximately random due to largely random defects being introduced into wafers during the silicon wafer manufacturing process, as discussed above. Moreover, high dark signal values in shielded array 34 are characterized in having approximately random magnitudes. In accordance with one embodiment of the present invention, the random nature of either or both the spatial distributions and magnitudes of high dark signal value pixels may be employed to create a unique or reasonably unique signature or identification tag that is used to identify a particular sensor, integrated circuit and/or die or chip 10.

In one embodiment of the present invention, a pre-selected number of highest dark signal values and their corresponding (row, column) addresses are identified from among a set of dark signal values corresponding to all or a portion of array 34, and a unique or reasonably unique signature or identification tag is generated on the basis of the (row, column) addresses of the pre-selected number of highest dark signal value pixels.

By way of example, and continuing to refer to FIG. 4, let us assume that the number of pre-selected highest dark signal values is five, that the five darkened pixels in FIG. 4 correspond to the five highest dark signal values measured from array 34, that such five highest dark signal value pixels have the (row, column) addresses and dark signal values shown in Table 1 below:

TABLE 1

Example High Dark Signal Addresses and Values Corresponding to FIG. 4

| Pixel | Address (row, column) | Measured High Dark Signal Value |
|---|---|---|
| a | (0, 1234) | 60 |
| b | (1, 378) | 12 |
| c | (2, 569) | 14 |
| d | (3, 1125) | 101 |
| e | (4, 6) | 10 |

Note that in the case of sensor 10 being an imaging sensor, the measured high dark signal value present in each pixel of array 34 will be proportional to the amount of time active pixel array 32 is exposed to light (or "integrated") owing to leakage currents increasing in magnitude as exposure time increases. Note further that in the present invention any number of pre-selected high dark signal values may be chosen to generate an identification signature or tag, and that such pre-selected number is not confined to the number "five." Indeed, such pre-selected number of high dark signal values may range between one value and several thousand values. Some examples of pre-selected numbers of values of the present invention may be selected from the group consisting of one value, two values, three values, four values, five values, six values, seven values, eight values, nine values, ten values, eleven values, values between one and twenty, values between one and fifty, and values between one and two hundred.

The higher the number of pre-selected values from an identification signature or tag is generated, the greater the probability that the resulting identification signature or tag will be unique in respect of a set of such signatures or tags generated from a number of mass-manufactured dies or sensors of a particular type or model. Conversely, the lower the number of pre-selected values from an identification signature or tag is generated, the lesser the probability that the resulting identification signature or tag will be unique.

It will now become apparent that the selection of the pre-selected number of highest dark signal values to be employed will depend on a number of factors, including, but not limited to, the total number of chips, sensors, dies or integrated circuits 10 of a particular model or series that are be manufactured, the number of pixels or memory cells contained in array 34 that are available for use, and the expected occurrence of measurable defects such as high dark signal values in array 34.

Continuing to refer to FIG. 4, Table 1 and the embodiment of the present invention described above, we now proceed to describe one illustrative method of generating an identification signature or tag on the basis of the (row, column) addresses corresponding to the five highest dark signal values of the above example. Dark signal values stored in each pixel of array 34 are downloaded along with image data from sensor 10 via digital output 70 to computer 125 using, for example, a frame grabber operating in conjunction with a CCIR or other appropriate communications protocol. In computer 125, image data are separated from dark signal data, and dark signal data values are sorted and processed in computer 125 to generate an identification signature or tag using a computer program such as the C++ program set forth below in Table 2:

TABLE 2

C++ Program for Processing High Dark Signal Data Values and Generating an Identification Signature or Tag

```
function run_getIdTag(outfile,opt1,opt2,device,ftype)
% usage
%         run_getIdTag(outfile,ftype);
%
%         opt =
%             opt(1) = directory containing site level
%             opt(2) = output choice; 0=> quiet, 1=> print tag,
%         outfile = output file name
%         ftype = input file type
%
% Check for number of inputs
if nargin < 1
    outfile = 'out';
    opt1 = 0;
    opt2 = 0;
    device = 'pulsar_EP';
    ftype = 'bmp';
elseif nargin == 1
    opt1 = 0;
    opt2 = 0;
    device = 'pulsar_EP';
    ftype = 'bmp';
elseif nargin == 2
    opt2 = 0;
    device = 'pulsar_EP';
    ftype = 'bmp';
elseif nargin == 3
    device = 'pulsar_EP';
    ftype = 'bmp';
elseif nargin == 4
```

TABLE 2-continued

C++ Program for Processing High Dark Signal Data
Values and Generating an Identification Signature or Tag

```
  ftype = 'bmp';
end
if length(device) < 9
     device(length(device)+1:9) = '';
end
% %%%%%%%%%%%%%%%%%%%%
% z defines the image area of interest (row/column data to be processed)
%         z(1,1:2) => (left,right)demosic pixel row
%         z(1,3:4) => (left,right)demosic pixel column
%         z(2,1:4) => (left,right)border pixel
%         z(3,1:4) => (left,right)reference and others pixel
%         z(4,1:4) => not used%
% z2 defines where the reference pixels are
%         z2(1,1) > 0 => # of rows used at start; < 0 => all
%         z2(1,2) > 0 => # of rows used at the end; < 0 => all
%         z2(2,1) > 0 => # of column used at the start; <0 => all
%         z2(2,2) > 0 => # of column used at the end; <0 => all
%
%
if device(1:4) == 'vega'
     z = [0,0,0,0; 0,0,0,0; 0,0,0,0; .1,.1,.8,0.002];
     z2 = [4,4; -1 -1];
     nn = 5;
elseif device(1:5) == 'janus'
     z = [0,0,0,0; 0,0,0,0; 0,0,0,0; .1,.1,.8,0.002];
     z2 = [0 6; -1 -1];
     nn = 5;
elseif device(1:9) == 'pulsar__EP'
     z = [0,0,0,0; 0,0,0,0; 0,0,0,0; .1,.1,.8,0.002];
     z2 = [2 10; -1 -1];
     nn = 5;
elseif device(1:6) == 'pulsar'
     z = [0,0,0,0; 0,0,0,0; 0,0,0,0; .1,.1,.8,0.002];
     z2 = [2 10; -1 -1];
     nn = 5;
elseif device(1:4) == 'nemo'
     z = [0,0,0,0; 0,0,0,0; 0,0,0,8; .1,.1,.8,0.002];
     z2 = [-1 -1; 8 8];
     nn = 5;
end
if (ischar(opt1))
     opt1 = str2num(opt1);
end
if (ischar(opt2))
     opt2 = str2num(opt2);
end
opt = [opt1, opt2];
path_is = pwd;
sLoc = strfind(path_is,'\');
if opt(1) > 0
     lotId = path_is(sLoc(end-2)+1:sLoc(end-1)-1);
     waferId = path_is(sLoc(end-1)+1:sLoc(end)-1);
     site = path_is(sLoc(end)+1:end);
else
     lotId = path_is(sLoc(end-1)+1:sLoc(end)-1);
     waferId = path_is(sLoc(end)+1:end);
     site = 'site1';
end
if outfile(1:3) == 'out'
     O_file = [lotId 'w' waferId site 'dieId.txt'];
else
     O_file = [outfile 'dieId.txt'];
end
z1 = sum(z(1:3,:));
fid = fopen(O_file,'w');
fprintf(fid,'die ID tag by pixel characteristic \n\n');
fprintf(fid,' Lot__id|Wafer__id|Die__id|site|Id tag0|Id tag1\n');
files = dir(['*.' ftype]);
[r,c]=size(files);
for i=1:r
     fname = files(i).name;
     if length(fname) > 32
str = ['Analysising file ..... ', fname];
disp(str);
sLoc = strfind(fname,'__');
dieId = fname(1:sLoc(1)-1);
```

TABLE 2-continued

C++ Program for Processing High Dark Signal Data
Values and Generating an Identification Signature or Tag

```
            dieId = strrep(dieId,'_',',');
            if ftype == 'bmp'
                img = double(imread(fname));
            elseif ftype == 'ppm'
                img = double(getPpmImg(fname));
            end
            [rr,cc,ff] = size(img);
            if (ff > 1)
                img = img(:,:,1);
            end
            if z2(1,1) < 0
                imgID = img(:,:);
                if z2(2,1) >= 0
                    imgID = [imgID(:,1:z2(2,1)),imgID(:,end-z2(2,2)+1:end)];
                end
            else
                imgID = [img(1:z2(1,1),:);img(end-z2(1,2)+1:end,:)];
                if z2(2,1) >= 0
                    imgID = [imgID(:,1:z2(2,1)),imgID(:,end-z2(2,2)+1:end)];
                end
            end
            [tag0,tag1] = get_idTag(imgID,nn);
            str2 = [lotId '|' waferId '|' dieId '|' num2str(site) '|' tag0 '|' tag1];
            if opt(2) > 0
                disp(str2);
            end
            fprintf(fid,str2);
            fprintf(fid,'\n');
        end
    end
fclose(fid);
```

Continuing to refer to the computer program of Table 2, the program identifies the five highest dark signal values and their corresponding (row, column) addresses and separates them from the remainder of the dark signal data. The addresses corresponding to those five highest dark signal values are then processed to yield a 20 hexadecimal string identification signature or tag that is unique to the sensor from which the dark signal data have been downloaded. The identification signature or tag generation process begins by generating a 4-hexadecimal character for each of the five identified addresses: 12 least-significant bits are provided for each specified column address (up to 4096 columns available), and 4 most-significant bits are provided for each specified row address (up to 16 rows). Thus, for example, pixel address "a" of (0,1234) set forth in Table 1 above is converted from (0,1234) to 0h,4d2h, which in turn is cascaded into 04d2h. Similarly, addresses b through e in Table 1 above are converted as follows:

b: (1,378) converts to 115ch
c: (2,569) converts to 2239h
d: (3,1125) converts to 3465h
e: (4,6) converts to 4006h In this example, the ID signature or tag is generated by combining the five addresses "a" through "e" in serial ordered fashion to yield the 20 hexadecimal string identification signature, which in the present example is:

042d115c223934654006

In respect of a high dark signal value associated with a single pixel at a fixed (row, column) address, the inventors have discovered that some variation over time may occur in the high dark signal value. The observed time variation is thought to be due to naturally occurring fluctuations in the voltages presented by "bad" pixels or cells, as well as inherent limitations in the means employed to measure such voltages. One consequence of this time variation is that the order in which high dark signal values and their corresponding addresses are arranged for processing to generate the identification signature or tag for a given sensor or die 10 may change depending on when, how and under what ambient conditions such data are downloaded from sensor 10. This in turn may result in multiple but different identification signatures or tags being generated for the same selected sensor 10. To preclude or minimize this possibility, high dark signal values and addresses may be downloaded two or more times sequentially from identification array 34 of a selected sensor, integrated circuit, chip or die 10, and the resulting data sets averaged or otherwise statistically treated to yield a more repeatable and stable identification signature or tag for sensor 10.

It will be understood by those skilled in the art that numerous variations, modifications, permutations and combinations of the foregoing identification signature or tag generation scheme may be employed with the benefit of the hindsight provided by the present disclosure, and that many of such variations, modifications, permutations and combinations will fall within the scope of the present invention.

For example, instead of converting the above five addresses to hexadecimal format they could be simply be serially combined to form the 15-digit identification signature 137825693112546. Alternatively, the addresses may be combined in a different order, or a mathematical algorithm may be employed to process the signatures to yield a different alphabetic, binary, numerical, hexadecimal or other identification signature or tag. Only row or only column data, or only respective portions thereof, may be used to generate the identification signature or tag. High dark signal values themselves (such as those listed in Table 1 above)—as opposed to high dark signal value addresses—may be employed to generate an identification signature or tag for each integrated circuit 10. Or high dark signal values may be combined with corresponding high dark signal addresses to yield an identification signature or tag for integrated circuit or sensor 10. More or fewer than 10 bits of high dark signal data may be employed to generate an identification signature or tag, or portion thereof, for integrated circuit or sensor 10.

Note that high dark signal values may be processed, and identification signatures or tags calculated or partially calculated on-board in sensor 10 by adding appropriate functionality to sensor 10.

Analog memory chips, sensors and integrated circuits, including, but not limited to, analog EEPROM chips, volatile and non-volatile analog memory chips, integrated circuits containing flash memory cells capable of storing more-than-simple binary, variable information or voltages, integrated circuits with analog multi-level storage capabilities, and the like, may likewise be adapted for use in accordance with the present invention. It will therefore be understood that optically shielded array 34 is but one embodiment or subset of a larger set of identification arrays 34 falling within the scope of the present invention.

The feasibility or desirability of employing some of the various embodiments of the present invention in a given type of sensor, integrated circuit, die or chip will in many cases depend on the total number of pixels, analog memory cells or memory cells that may be dedicated to providing a separate array 34, as well as the statistical occurrence of measurable defects in the pixels or cells of such array 34. These two factors will often determine whether a given sensor, integrated circuit, die or chip 10 may be identified with sufficient particularity or uniqueness according to the pre-determined requirements of a given die identification program. In some embodiments of the present invention, the possibility of the same identification signature or tag being generated for different sensors 10 is deemed acceptable because of the low statistical probability of such occurring in respect of more than a handful of sensors. Under such a scenario, the risk of multiple identical identification signatures or tags being generated for different sensors may be deemed acceptable. Accordingly, a lower number of pixels or memory cells may be employed as a basis for generating the identification signature or tag.

It will now become apparent that a virtually limitless number of different circuit architectures and computational techniques may be employed to generate a unique or close-to-unique identification signature or tag for different types of chips, integrated circuits, dies and sensors 10 in accordance with the teachings of the present invention.

Figure 5:
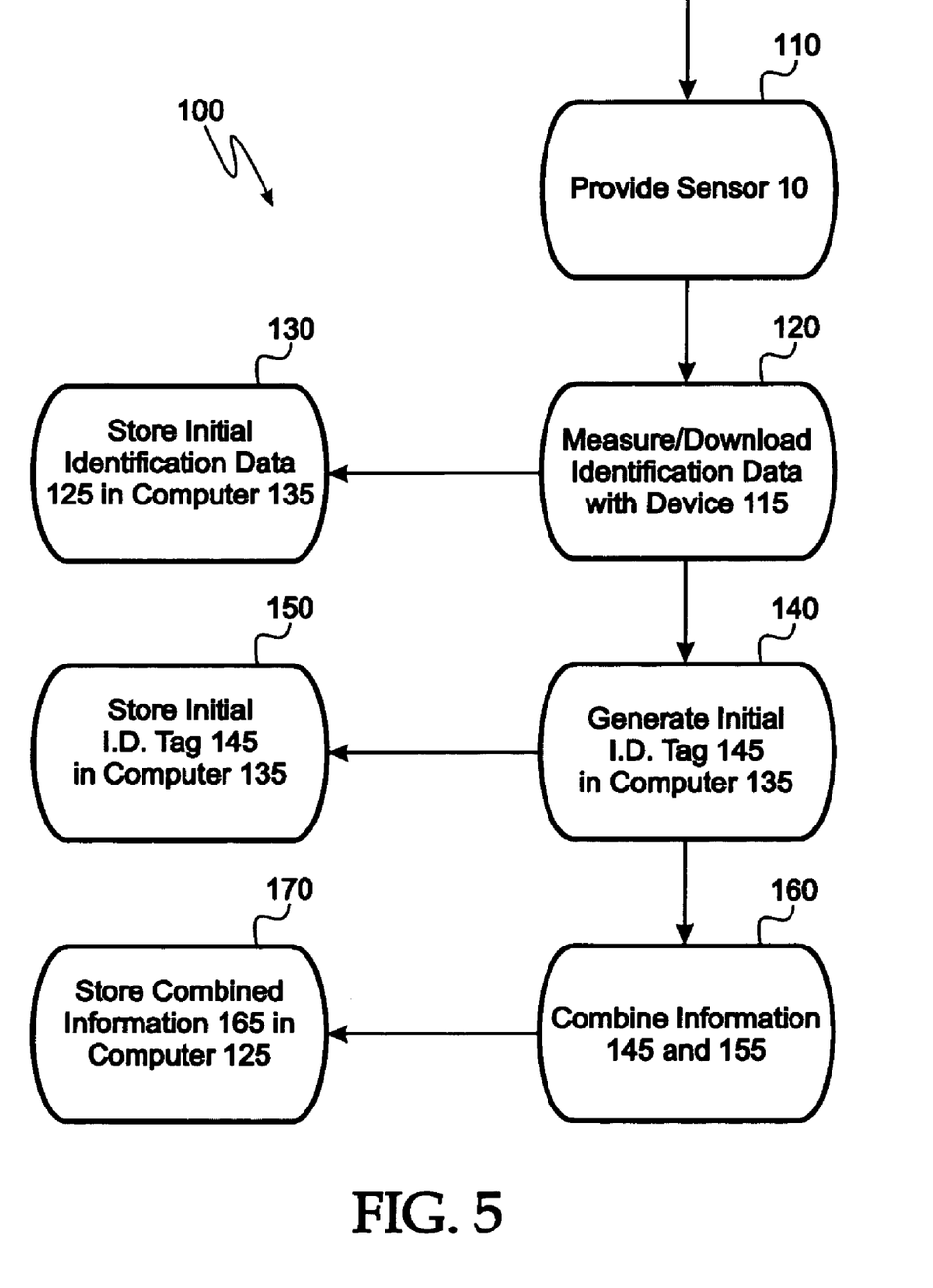
FIG. 5 shows a flow diagram according to one embodiment of a method of the present invention.

Referring now to FIG. 5, there is shown method 100 according to one embodiment of the present invention. In step 110, selected integrated circuit, sensor, chip or die 10 is provided having identification array 34 incorporated therein. At step 120 selected sensor 10 is operatively connected to one or more devices 115 well known in the art such as a suitable frame grabber capable of downloading data residing in and/or associated with the pixels or memory cells of identification array 34, and transferring and/or storing same to or in computer 125 in step 130. Note that once the identification data have been received from sensor 10 and/or identification tag 145 has been generated, either or both may be stored in a database or other computer readable medium such as, by way of non-limiting example, a computer hard drive, a server, floppy disk, cache memory, a pipeline, volatile or non-volatile computer memory, a buffer, RAM, SRAM or DRAM memory, EEPROM, or on a CD or DVD.

Once stored or resident in computer 125, the identification data are processed at step 140 to generate initial identification tag 145 corresponding to selected sensor 10. In one embodiment of the present invention, data downloaded from identification array 34 of selected sensor 10 are processed to yield a pre-selected number of data values having pre-determined characteristics, such as those having the highest values, the lowest values, median values, average values, or those falling fall within a pre-determined range of values. In one such embodiment of the present invention, and as discussed above, (row, column) addresses corresponding to a pre-selected number of data values having pre-determined characteristics are used to calculate an identification signature or tag corresponding to the selected integrated circuit, sensor, chip or die 10.

Many different paths may be taken to generate identification tag 145 for selected sensor 10. For example, high dark signal values may be employed, in combination with—or not in combination with—(row, column) address data to generate initial identification tag 145. As described in the detailed discussion set forth above, numerous other possibilities exist for generating initial identification tag 145 in accordance with the present invention, only some of which may realistically be listed or discussed explicitly herein owing to the vast number of possibilities that will become apparent to one of ordinary skill in the art upon having read and understood the present disclosure.

Continuing to refer to FIG. 5, initial identification tag 145 corresponding to selected sensor 10 may be saved in a computer database or other computer readable medium at step 150. Alternatively or in addition to step 150, initial identification tag 145 is combined with other information 155, which comprises other pertinent or desired information 155 associated with identification tag 145 and may include, but not be limited to:

Manufacturing information
Date of manufacture
Time of manufacture
Manufacturing run number
Type or model number of integrated circuit or sensor
Manufacturing plant identification
Materials or components employed
Suppliers of materials or components
Shipping date
Manufacturing ambient environment data (e.g., temperature, time, etc.)
Wafer or wafer batch from which integrated circuit was manufactured
Customer for which integrated circuit or sensor was manufactured
Information regarding problems or particularities occurring on the date of Manufacture or during the manufacturing run
Intellectual property royalty, licensing or identification information
Trade secret information
Copyright information
Intellectual property identification information
Other desired or relevant information pertaining to the selected sensor, integrated circuit, die or chip Once identification tag 145 and other information 155 corresponding to selected sensor 10 have been combined, either or both types of information may be saved or stored in a computer readable medium at step 170 for later retrieval. Sensor 10 may thereafter be identified at any time and other information 155 associated therewith may be retrieved from computer 125.

Figure 6:
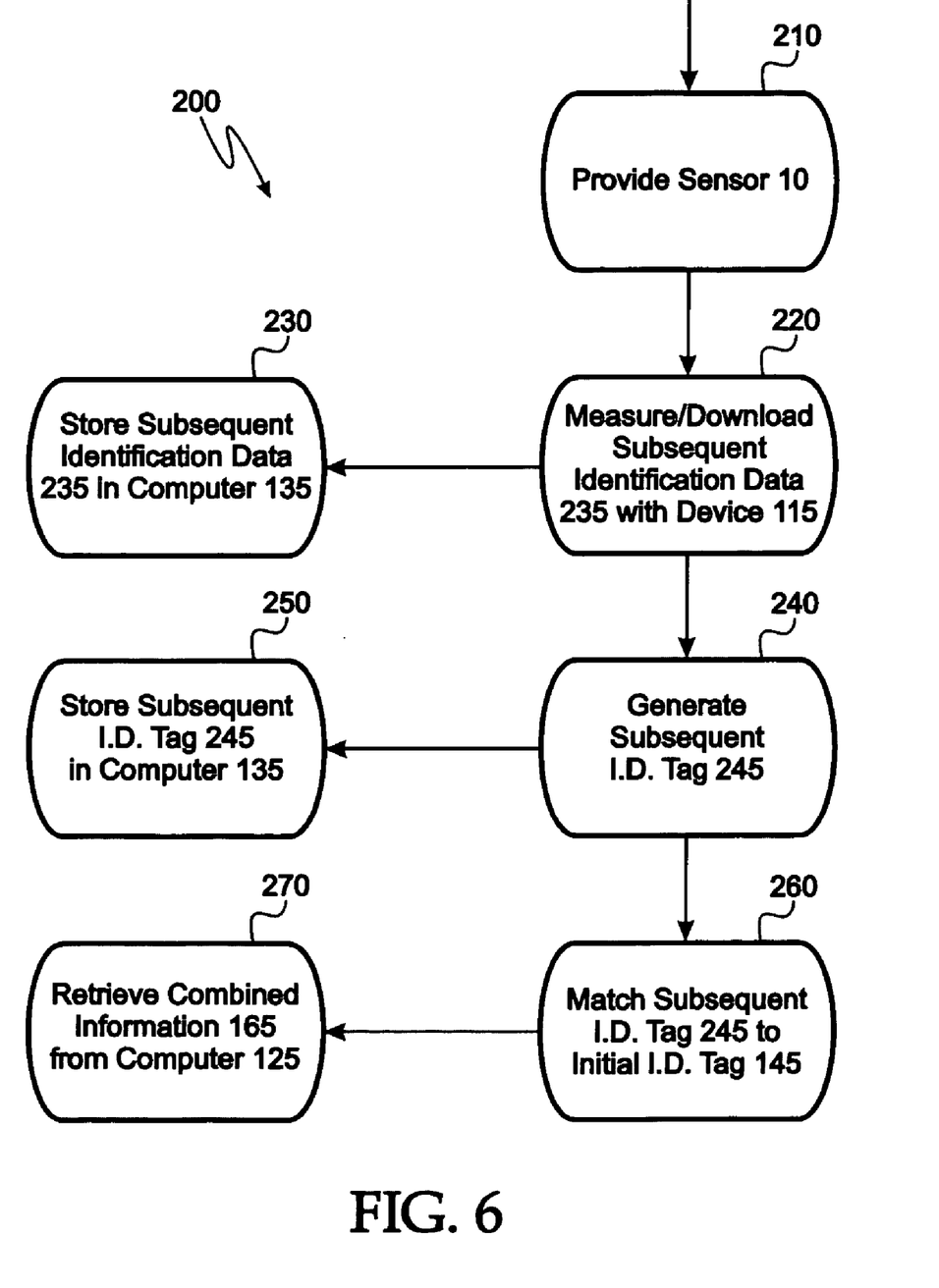
FIG. 6 shows a flow diagram according to another embodiment of a method of the present invention.

FIG. 6 shows method 200 according to one embodiment of the present invention, where sensor 10 is provided at step 210, and subsequent identification data 235 from identification array 34 are downloaded at step 220. (Note that, with the exception of naturally occurring fluctuations in high dark signal values discussed above, subsequent identification data 235 should be identical to initial identification data 125.) Subsequent identification tag 245 is generated at step 240 using the same process as that originally employed to generate initial identification tag 145 (which was previously stored in a computer readable medium by computer 135 according to method 100 of FIG. 5). Subsequent identification tag 245 is compared to entries in the computer readable medium via computer 135 and associated or matched with initial identification tag 145. Other information 155 associated with initial identification tag 145 may now be retrieved from the computer readable medium and associated with selected sensor 10 and subsequent identification tag 245. In such a manner, selected sensor 10 may be identified with particularity (or at least with a reasonable degree of particularity), and other information 155 may be employed to effect any number of applications, including but not limited to:

Tracking dies during or after manufacturing

Tracking die inventories

Determining the date upon which a particular die or group of dies was manufactured or shipped from the foundry Determining the particular manufacturing batch corresponding to a particular die Determining the process, manufacturing or material history corresponding to a sensor or integrated circuit Identifying or associating manufacturing problems in particular dies or batches of dies Identifying problems in or associate materials used to manufacture particular dies or batches of dies Calculating or determining royalties Determining which patents and/or licenses correspond to which dies Determining whether appropriate licenses have been taken from the licensor by the manufacturer of a die or group of dies Determining ownership of a die or group of dies Recording or determining uses or applications of a die or group of dies Improving quality control during the die manufacturing process Sorting dies during or after the die manufacturing process Acquiring and using die defect or failure data Other applications Many different combinations, variations, adaptations and permutations may be made respecting the methods illustrated in FIGS. 5 and 6 and yet nevertheless fall within the scope of the present invention. For example, and by way of non-limiting example, computer 125 may be a personal computer, a mainframe computer, a series of computers connected by a network, multiple separate or connected computers, or one or more microprocessors, CPUs, or more processors, DSPs or controllers. Some of the steps illustrated in FIGS. 5 and 6 may be left out, while other steps not shown in FIGS. 5 and 6 may be added. Other information 155 need not be stored or retrieved together, stored or retrieved at the same time, or stored or received in the same computer 125 or the same computer readable medium. Instead, identification tags 145 and 245 should be capable of being associated with one another, as well as with other information 155 according to any of a number of methods and techniques well known in the art.

In another embodiment of the present invention, addresses such as data locations of "bad" or defective memory cells in flash, RAM, SRAM, DRAM, EEPROM and other types of memory chips are employed to identify such chips in accordance with the teachings of the present invention. In such an embodiment, an integrated circuit ("IC") is provided comprising an array of memory cells, where each memory cell has a unique address or data location associated therewith. The addresses of one or more defective memory cells in the selected IC are determined, and from among the addresses corresponding to the defective memory cells, selected defective cell addresses are selected. Next, using the selected defective addresses an identification tag corresponding to the selected IC is generated, which may then be stored, saved, manipulated or otherwise used in accordance with the teachings set forth herein.

The preceding specific embodiments are illustrative of the practice of the invention. It is to be understood, therefore, that other expedients known to those skilled in the art or disclosed herein may be employed without departing from the invention or the scope of the appended claims. For example, the present invention is not limited to imaging sensors but may be employed, for example, in analog memory integrated circuits. The present invention is not limited to CMOS sensors, and may be employed in other types of semiconductor devices. Imaging, analog memory or memory portions of integrated circuits may be physically separated from circuitry having other types of functionality and therefore not reside on the same integrated circuit having such circuitry. The present invention may also be employed in imaging sensors using charge coupled devices (CCDs) instead of photodiodes.

Having read and understood the present disclosure, those skilled in the art will now understand that many combinations, adaptations, variations and permutations of known memory chips, imaging sensors and analog memory integrated circuits may be employed successfully in the present invention.

In the claims, means plus function clauses are intended to cover the structures described herein as performing the recited function and their equivalents. Means plus function clauses in the claims are not intended to be limited to structural equivalents only, but are also intended to include structures which function equivalently in the environment of the claimed combination.

Note that in the present specification and claims, in many cases the term "integrated circuit" (or "IC") is intended to mean any one of an "IC," a "sensor," a "die" and/or a "chip." It is to be understood that various components of the ICs of the present invention and/or the devices or computers employed to carry out the methods of the present invention described herein may be partitioned or distributed among different ICs, devices or computers or networks. The term "address" includes within its scope the term "data location," as well as non-(row, column)-based addresses.

All printed publications and patents referenced hereinabove are hereby incorporated by referenced herein, each in its respective entirety.

We claim:

1. A method of generating a unique identification tag corresponding to a selected imaging sensor, the sensor comprising a first array of image pixels and a second array of reference pixels, the first array being configured to capture images; the second array being configured to permit dark level compensation of images captured by the first array, each reference pixel having a dark current value and an address associated therewith, the method comprising:

providing the selected imaging sensor, downloading a first number of dark signal values and addresses corresponding thereto from the second array;

selecting, from among the first number of dark signal values and addresses corresponding thereto, a second number of selected highest dark signal values and addresses corresponding thereto, the second number being less than the first number; and generating, from the second number of selected highest dark signal values and addresses corresponding thereto, a unique identification tag corresponding to the selected sensor.

2. The method of claim 1, wherein the addresses are (row, column) addresses.

3. The method of claim 1, further comprising at least one of storing and saving the downloaded dark signal values and addresses corresponding thereto.

4. The method of claim 1, further comprising at least one of storing and saving the unique identification tag in a computer readable medium.

5. The method of claim 1, further comprising combining the initial unique identification tag with other information to form combined information.

6. The method of claim 1, further comprising determining whether the unique identification tag has been generated previously.

7. The method of claim 1, further comprising retrieving other information associated with the unique identification tag.

8. The method of claim 1, further comprising using the unique identification tag to at least one of track the sensor during manufacturing, track the sensor after manufacturing, track sensor inventory, determine the date upon which the sensor was manufactured or shipped from the foundry, determine the particular manufacturing batch corresponding to the sensor, determine the process, manufacturing or material history corresponding to the sensor, identify manufacturing problems associated with the sensor, identify material problems associated with the sensor, calculate or determine royalties associated with the sensor, determine which patents or licenses correspond to the sensor, determine whether an appropriate license has been taken by the manufacturer of the sensor, determine ownership of the sensor, record or determine the uses or applications of the sensor, improve quality control, sort the sensor, and acquire or use sensor defect or failure data.

9. The method of claim 1, further comprising associating other information with the unique identification tag.

10. The method of claim 9, wherein the other information is selected from the group consisting of manufacturing information, date of manufacture, time of manufacture manufacturing run number, type or model number of selected sensor, manufacturing plant identification, materials or components employed, suppliers of materials or components, shipping date, manufacturing ambient environment data, wafer or wafer batch from which selected sensor was manufactured, customer for which integrated selected sensor was manufactured, information regarding problems or particularities occurring on the date of manufacture or during the manufacturing run, intellectual property royalty, licensing or identification information, trade-secret information, copyright information, and intellectual property identification information.

11. A method of uniquely identifying a selected imaging sensor, the sensor comprising a first array of image pixels and a second array of reference pixels, the first array being configured to capture images, the second array being configured to permit dark level compensation of images captured by the first array, each reference pixel having a dark current value and an address associated therewith, the method comprising:

providing the selected imaging sensor;

downloading a first number of dark signal values and addresses corresponding thereto from the second array;

selecting, from among the firm number of dark signal values and addresses corresponding thereto, a second number of selected highest dark signal values and addresses corresponding thereto, the second number being less than the first number;

generating, from the second number of selected highest dark signal values and addresses corresponding thereto, a unique identification tag corresponding to the selected sensor, and associating the unique identification tag with a previously generated identification tag stored in a computer readable medium.

12. The method of claim 11, wherein the addresses are (row, column) addresses.

13. The method of claim 11, further comprising at last one of storing and saving the downloaded dark signal values and addresses corresponding thereto.

14. The method of claim 11, further comprising at least one of storing and saving the unique identification tag in a computer readable medium.

15. The method of claim 11, further comprising combining the unique identification tag with other information to form combined information.

16. The method of claim 11, further comprising retrieving other information associated with the unique identification tag.

17. The method of claim 11, further comprising using the unique identification tag to at least one of track the sensor during manufacturing, track the sensor after manufacturing, track sensor inventory, determine the date upon which the sensor was manufactured or shipped from the foundry, determine the particular manufacturing batch corresponding to the sensor, determine the process, manufacturing or material history corresponding to the sensor, identify manufacturing problems associated with the sensor, identify material problems associated with the sensor, calculate or determine royalties associated with the sensor, determine which patents or licenses correspond to the sensor, determine whether an appropriate license has been taken by the manufacturer of the sensor, determine ownership of the sensor, record or determine the uses or applications of the sensor, improve quality control, sort the sensor, and acquire or use sensor defect or failure data.

18. The method of claim 11, further comprising associating other information with the unique identification tag.

19. The method of claim 18, wherein the other information is selected from the group consisting of manufacturing information, date of manufacture, time of manufacture manufacturing run number, type or model number of selected sensor, manufacturing plant identification, materials or components employed, suppliers of materials or components, shipping date, manufacturing ambient environment data wafer or wafer batch from which selected sensor was manufactured, customer for which integrated selected sensor was manufactured, information regarding problems or particularities occurring on the date of manufacture or during the manufacturing run, intellectual property royalty, licensing or identification information, trade secret information, copyright information, and intellectual property identification information.

20. A system for generating a unique identification tag corresponding to a selected integrated circuit, the integrated circuit comprising a first array of image pixels and a second array of reference pixels, the first array being configured to capture images, the second array being configured to permit dark level compensation, each reference pixel having a dark current value and an address associated therewith, the system comprising:

means for providing the selected integrated circuit;

means for downloading or measuring a first number of signal levels and addresses associated therewith;

means for selecting, from among the first number of dark signal values and addresses associated therewith, a second number of selected highest dark signal values and the addresses associated therewith, the second number being less than the first number; and means for generating, from the second number of selected highest dark signal values and addresses associated therewith, a unique identification tag for the selected integrated circuit.

21. The system of claim 20, further comprising means for at least one of storing and saving the dark signal levels and addresses associated therewith in a computer readable medium.

22. A method of generating a unique identification tag corresponding to a selected integrated circuit, the integrated circuit comprising a first array of cells or pixels and a second array of cells or pixels, the cells or pixels of the first array being configured to carry out a first function, the cells or pixels of the second array being configured to carry out a second function different from the first function, each cell or pixel in the second array having a signal level and address corresponding thereto, the method comprising:

providing the selected integrated circuit;

downloading or measuring a first number of signal levels and corresponding addresses from the second array;

selecting, from among the first number of signal levels, a second number of selected signal levels having predetermined characteristics indicative of pixel anomalies, defeats, or failure, the second number being less than the first number; and generating, using the addresses corresponding to the selected signal levels, a unique identification tag for the selected integrated circuit.

23. The method of claim 22, wherein the predetermined characteristics include highest dark signal levels.

24. A method of generating a unique identification tag corresponding to a selected means for imaging, the imaging means comprising a first array of means for capturing light and a second array of masked means for capturing light, the first array being configured to capture images, the second array being configured to permit dark level compensation of images captured by the first array, each masked means for capturing light having a dark signal value and an address associated therewith, the method comprising:

providing the selected imaging means;

downloading a first number of dark signal values and addresses corresponding thereto from the second array;

selecting, from among the first number of dark signal values and addresses corresponding thereto, a second number of selected highest dark signal values and addresses corresponding thereto; and generating, from the second number of selected highest dark signal data and addresses corresponding thereto, the unique identification tag.

25. The method of claim 24, wherein the addresses are (row, column) addresses.

26. The method of claim 24, further comprising at least one of storing and saving the identification tag in a computer readable medium.

27. The method of claim 24, further comprising combining the identification tag with other information to form combined information.

28. The method of claim 24, further comprising determining whether the unique identification tag has been generated previously.

29. The method of claim 24, further comprising retrieving other information associated with the unique identification tag.

30. The method of claim 24, further comprising using the unique identification tag tout least one of track the imaging means during manufacturing, track the imaging means after manufacturing, track imaging means inventory, determine the date upon which the imaging means was manufactured or shipped from the foundry, determine the particular manufacturing batch corresponding to the imaging means, determine the process, manufacturing or material history corresponding to the imaging means, identify manufacturing problems associated with the imaging means, identify material problems associated with the imaging means, calculate or determine royalties associated with the imaging means, determine which patents or licenses correspond to the imaging means, determine whether an appropriate license has been taken by the manufacturer of the imaging means, determine ownership of the imaging means, record or determine the uses or applications of the imaging means, improve quality control, sort the imaging means, and acquire or use imaging means defect or failure data.

31. The method of claim 24, further comprising associating other information with the unique identification tag.

32. The method of claim 31, wherein the other information is selected from the group consisting of manufacturing information, date of manufacture, time of manufacture manufacturing run number, type or model number of selected imaging means, manufacturing plant identification, materials or components employed, suppliers of materials or components, shipping date, manufacturing ambient environment data, wafer or wafer batch from which selected imaging means was manufactured, customer for which integrated selected imaging means was manufactured, information regarding problems or particularities occurring on the date of manufacture or during the manufacturing run, intellectual property royalty, licensing or identification information, trade secret information, copyright information, and intellectual property identification information.

* * * * *